United States Patent
Mauney

[19]

[11] Patent Number: 6,116,318
[45] Date of Patent: Sep. 12, 2000

[54] MOBILE DECAL REMOVAL SYSTEM

[76] Inventor: Erik Mauney, 2910 E. Moore, No. 44, Searcy, Ark. 72143

[21] Appl. No.: 09/187,207

[22] Filed: Nov. 6, 1998

[51] Int. Cl.$^7$ ...................................................... B32B 35/00
[52] U.S. Cl. .......................... 156/584; 156/344; 219/202; 15/52.1; 15/53.3; 15/4
[58] Field of Search ................................... 156/344, 584; 15/52.1, 53.1, 53.2, 53.3, 4; 219/202

[56] References Cited

U.S. PATENT DOCUMENTS

| | | | |
|---|---|---|---|
| 2,918,685 | 12/1959 | Sundstrom | 15/4 |
| 2,950,492 | 8/1960 | Liekweg | 15/53.2 X |
| 3,045,992 | 7/1962 | Asbury | 299/39.7 |
| 3,920,472 | 11/1975 | Vinson | 134/6 |
| 4,050,109 | 9/1977 | Learned | 15/53.2 |
| 4,690,724 | 9/1987 | Outlaw | 156/584 |
| 4,835,811 | 6/1989 | Crowhurst | 15/21 E |
| 4,930,176 | 6/1990 | Gelman | 15/4 |
| 4,989,293 | 2/1991 | Bashyam | 15/383 |
| 5,004,156 | 4/1991 | Montanier | 239/130 |
| 5,133,100 | 7/1992 | Hill et al. | 15/53.2 |
| 5,219,378 | 6/1993 | Arnold | 156/584 X |
| 5,235,751 | 8/1993 | Landgraf | 156/584 X |
| 5,259,914 | 11/1993 | Fisher | 156/584 |
| 5,269,874 | 12/1993 | Winter | 156/584 |
| 5,280,662 | 1/1994 | Van Fossen | 15/50.1 |

*Primary Examiner*—Mark A. Osele
*Attorney, Agent, or Firm*—Stephen D. Carver

[57] ABSTRACT

A powered system for removing large decals in the order of fifty feet or more comprises an upright, supporting frame ideally adapted for mounting upon a vehicle and a dynamic power head flexibly supported by the frame. A generally rectangular subframe is slidably coupled to the frame, captivated between a pair of vertically oriented stanchions. The subframe and the power head are vertically displaced with a hydraulic cylinder. An offset tilt mechanism mounted to the subframe dynamically mounts the power head. Preloaded springs extend between the vertically movable subframe and the tilting plate, which is pivoted to the subframe. A hydraulic cylinder deflects the pivot plate to an angle of attack that aligns the power head against the wall of the truck being serviced. The power head is preferably coupled to the tilting plate by fasteners that captivate suitable compensation springs. The power head comprises a rotary drum-like brush mounted driven by a hydraulic drive motor. Preferably the brush has approximately two hundred and sixty outwardly projecting rubber fingers arranged in a spiral pattern that forcibly remove the decal and adhesive. A roller assembly balances the power head as the brush is pressed against the decal. A concave reflector between the brush and the roller assembly comprises an electrically resistive heating element that supplies several thousand watts of radiant energy directed towards the decal under attack.

19 Claims, 6 Drawing Sheets

MOBILE DECAL REMOVAL SYSTEM

BACKGROUND OF THE INVENTION

I. Field of the Invention

The present invention relates generally to mobile, upright systems for cleaning vertical surfaces, especially truck trailer sides. More particularly, the present invention relates to mobile systems equipped with vertically upright rotating brushes of the type classified in United States Patent Class 15, Subclasses 52.2, 52.3, 53.1 and 53.2.

II. Description of the Prior Art

As will be readily appreciated, many large retailers and wholesalers operate their own tractor trailer rigs to haul goods to market. For tax and accounting reasons, many large trailers are rented or leased for a relatively short period of time, before being returned to the lessee. While most over-the-road tractor trailers are marked with advertisements, or the name of the trucking company or owner, not all are carefully painted. Instead, it is becoming increasingly common for these large trailers to be economically marked along both sides with very large, vinyl decals. Large tractor trailers can exceed ten feet in height, and may be up to fifty three feet or more long. Very large decals are thus required. These are installed at the commencement of the lease, and they must be removed at the completion of the lease period when the trailers are turned back to the lessee.

At this time the decals must be removed. Further, they must be non-destructively removed so as to minimize scarring or defacing of the outer trailer wall surfaces. With known prior art equipment it is very difficult and time consuming to remove such decals.

A number of portable, hand-held decal removal tools are known in the art. These small-but-handy devices are not equipped to handle fifty foot long truck decals. For example, U.S. Pat. No. 4,690,724 discloses structure designed to remove small, vinyl decals, but not the adhesive, from automotive surfaces. The tool is effective in removing small decals, but it is utterly insufficient for use with large truck decals as the labor costs and time required for success are prohibitive. Further, with this device, a solvent must thereafter be applied to remove the sticky adhesive. The tool could be used to remove a decal ten feet tall and fifty-three feet long.

U.S. Pat. No. 5,259,914 entitled "Portable Vehicle Adhesive Remover" discloses a portable device using a rotating eraser unit to remove decal material and adhesive from automotive surfaces. It is activated with air pressure. This small handheld device is designed for small applications such as the removal of small pinstripes or trim tape. It is effective for its designed use, but would prove, and has been proved, inefficient for large scale tasks.

U.S. Pat. No. 5,269,874 entitled "Portable Apparatus for Removing Heat Softenable Coverings" discloses apparatus having a rotating eraser for frictionally removing decal and adhesive material from automotive surfaces. It is activated with an electrical drill. This handheld device is designed for small applications such as pinstripe tape or trim tape removal from cars. It is effective for this limited purpose, but has been proven inefficient for large scale tasks.

U.S. Pat. No. 3,920,472 entitled "Decal Removal Method" uses a chemical system for removing adhesive. It is one part of a multi-step process and is not designed to remove vinyl decals. For this chemical to work, the decal must be previously removed.

Much larger machines that could economically clean the surface areas of typical truck trailers are known. For example, U.S. Pat. No. 5,280,662 entitled "Mobile Tunnel Surface Cleaning Machine" discloses a device using rotating brushes to clean roadway tunnels. This machine will not safely remove decals and adhesive from large motor vehicles. Adeequate heat is not supplied to soften the decal and adhesive. Further, required dynamic adjustment means for covering the large surface area presented by a fifty foot decal are missing from the invention.

U.S. Pat. No. 5,004,156 entitled "Washing Device" discloses an invention that directs hot, high pressure water against surfaces for cleaning. High pressure water will remove vinyl decals, but will not concurrently remove the underlying adhesive from the metallic surfaces being treated. A chemical solvent must be implemented to breakdown the adhesive. In addition, painted surfaces will invariably chip with a high pressure water and powerful chemical combination.

U.S. Pat. No. 4,835,811 entitled "Brushing and Washing Machine" discloses a versatile apparatus designed to wash many surfaces. However, it will not remove decals and adhesive from any metallic surface under any condition. It is specifically designed to wash surfaces to which decals are adhered and not alter or disrupt the decal in any way. The depicted machine is widely used and is very effective for its limited uses.

U.S. Pat. No. 5,133,100 discloses a "Portable Truck Washer" designed to wash tractor trailers and busses. However, tests of similar devices reveal that such structure will not remove decals and adhesive from metallic truck trailer surfaces under any conditions. This device is specifically designed to non-destructively wash over trailer surfaces and the decals that are adhered thereto. The disclosed device does not and not alter or disrupt the decal in any way. However, the disclosed machine is widely used and commercially successful. It is very effective at reliably cleaning truck trailers.

U.S. Pat. No. 2,854,680 shows a vehicle washing machine wherein the brush is suspended from an over head rail. This unit is not mobile and cannot be taken to the washing area.

U.S. Pat. No. 2,876,472 discloses a portable washing and brushing machine mounted on a fork lift truck, the machine having a rotatable brush element which is vertically mounted on a shaft driven by a hydraulic motor. A series of spray nozzles are supplied with water from a pump driven by a belt.

U.S. Pat. No. 3,680,164 discloses a mobile machine for cleaning the external surfaces of an aircraft, a brush being mounted on an articulated arm. Similarly U.S. Pat. No. 3104406 has brushes mounted on an articulated arm for cleaning road transport vehicles.

U.S. Pat. No. 3,830,430 shows a machine for cleaning the inside of a vehicle.

SUMMARY OF THE INVENTION

My mobile decal remover system is especially adapted for non-destructively removing decals from large trailers. The system is design for mobile applications, and it may be mounted upon a variety of vehicles. A one-time pass is necessary for the system to completely remove the vinyl decal and adhesive.

My system comprises an upright, supporting frame that flexibly mounts a dynamic power head that removes decals. A generally rectangular subframe is slidably captivated to twin, vertical stanchions extending from the frame top to the frame base. The subframe can be vertically, slidably displaced with a hydraulic cylinder. A tilt mechanism mounted to the subframe connects to the power head.

Preloaded springs couple the head mounting bracket to the tilting mechanism to enable the power head to compensate for dimensional variations. The power head is dynamically coupled to the vertically movable subframe by a tilting mechanism comprising a tilting plate that is offset from the subframe midsection and pivoted thereto. The pivot plate include a projecting clevis pivoted between suitable arms projecting from the subframe. A hydraulic actuator displaces the pivot plate as desired by the operator to align the power head against the wall of the truck being serviced. The power head is preferably coupled to the tilting plate by fasteners that captivate suitable springs that normally bias the power head and the tilting plate apart. These compensation springs help align the apparatus.

The power head comprises a pair of upper and lower struts forming a frame. An elongated, rotary drum-like brush is mounted for rotation at the left, extending between a hydraulic drive motor in the upper strut and a bearing in the lower strut. Preferably the brush has approximately two hundred and sixty outwardly projecting rubber fingers arranged in a spiral pattern. These fingers forcibly remove the decal and adhesive. A roller assembly at the right side of the power head balances the brush as it contacts the trailer surface. A concave mirrored, reflector between the brush and the roller assembly is equipped with and electrically resistive heating element. The reflector projects several thousand watts of radiant energy towards the decal portion under attack by the brush and roller system.

Thus a basic object of my invention is to quickly and efficiently remove large decals (i.e., in the order of fifty feet) from truck trailers.

A related object is to provide a highly mobile system for non-destructively removing large decals from truck trailers.

A similar object is to provide a system of the character described that is vastly less time consuming than known prior art solutions.

Another object is to provide a powered decal removal system of the character described that avoids the marring or chipping of underlying protective paint.

A still further object is to render it unnecessary, after a decal has been removed, for the now-exposed surface to be refinished, coated, primed or repainted.

Another important object is to relatively uniformly distribute heat during the decal removal process to avoid scorching or burning selected areas of the truck trailer finish.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
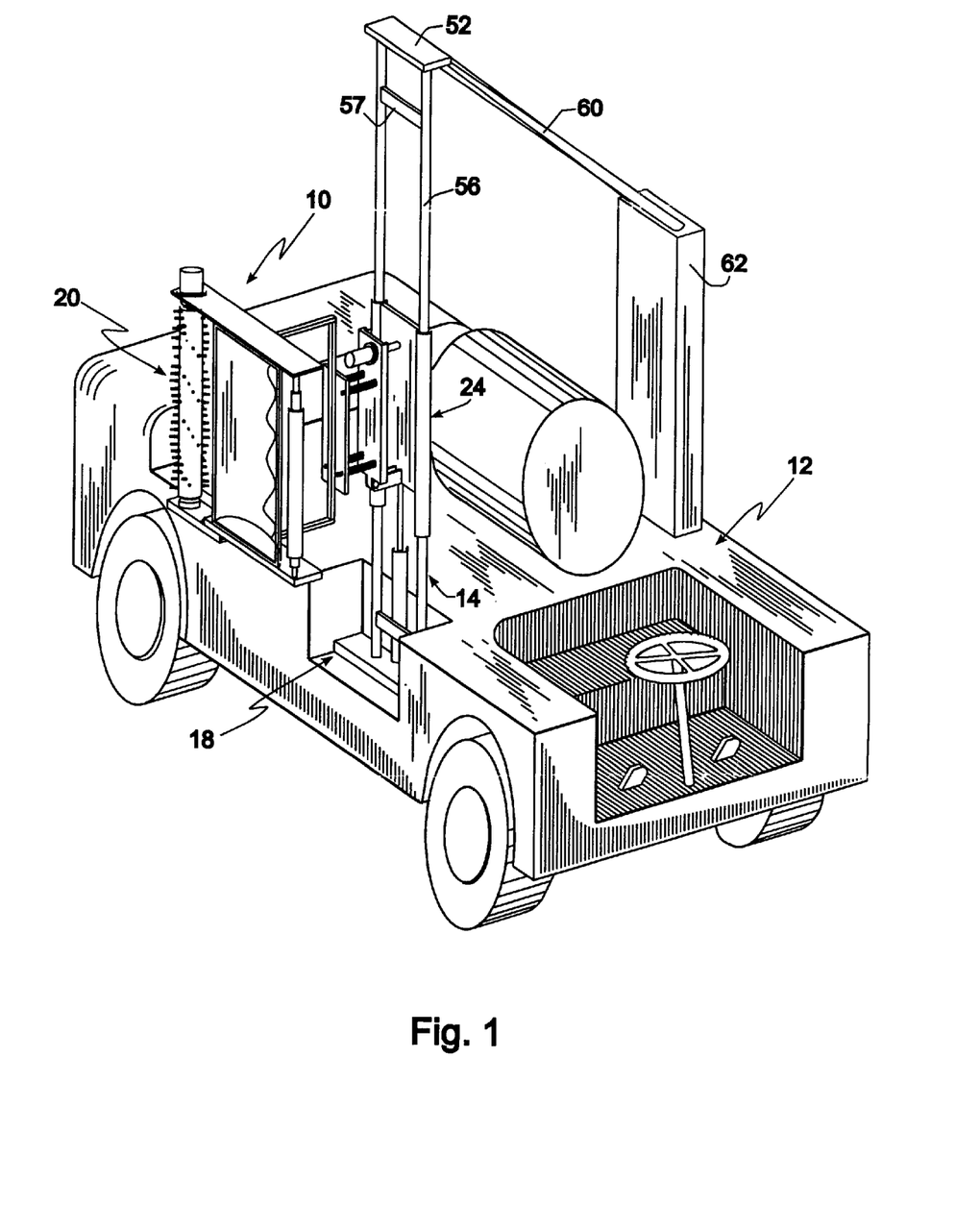
FIG. 1 is a fragmentary pictorial view showing my system mounted upon a suitable service vehicle.
Figure 2:
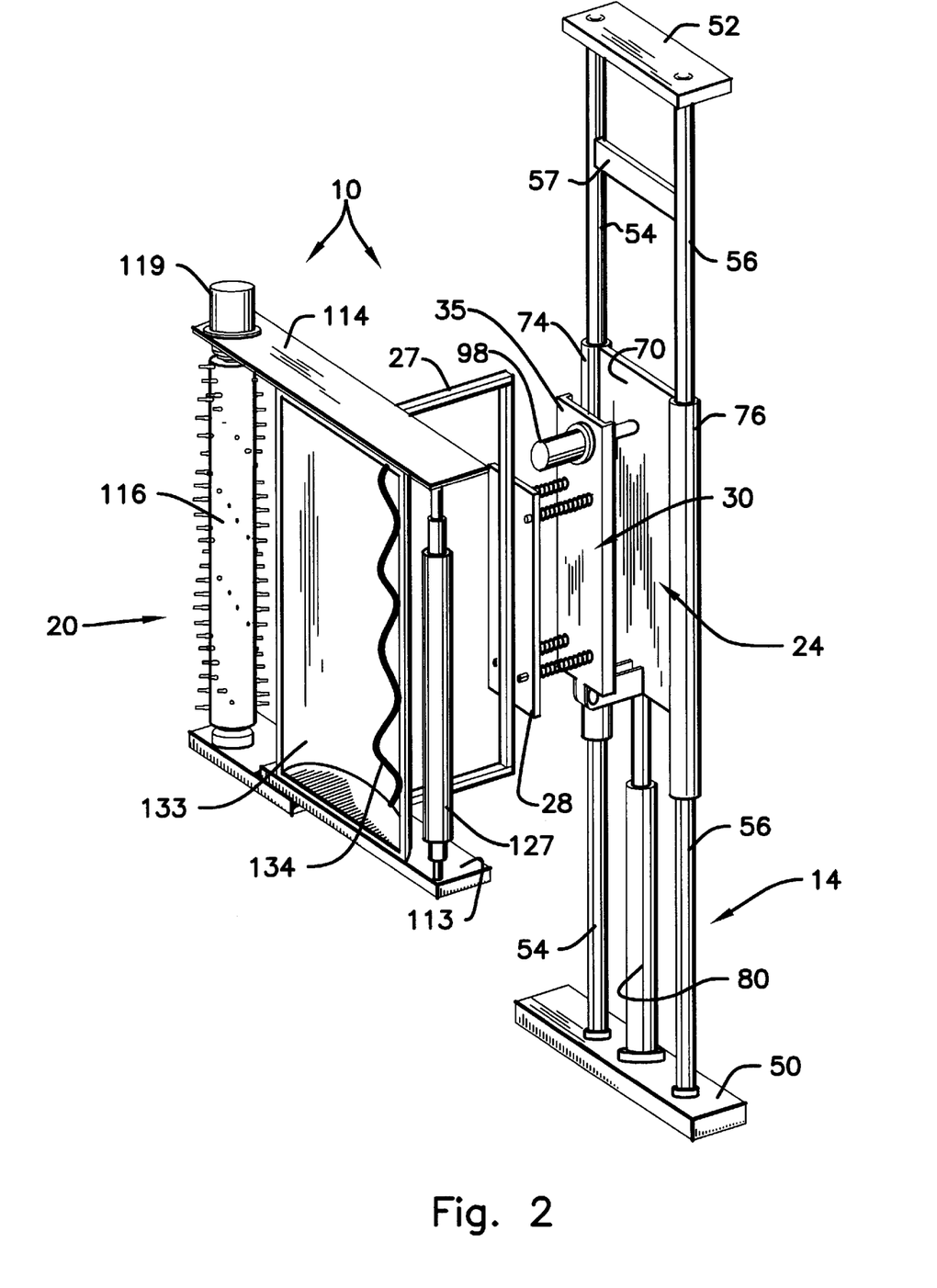
FIG. 2 is an enlarged, fragmentary, isometric view of the system.

Turning initially to drawing FIGS. 1–4, my basic decal removal system has been generally designated with the reference numeral 10. FIG. 1 illustrates how the system may be mounted within a conventional service vehicle 12, so it can be transported by a suitable truck and moved adjacent the trailer requiring treatment. System 10 essentially comprises a vertically upright, supporting frame 14 adapted to be secured to a supporting surface. In the best mode, frame 14 will be secured to a suitable conventional service vehicle 12 or flatbed truck, fixed to a suitable supporting surface 18 (FIG. 1). A dynamic power head 20 ultimately supported by frame 14 projects towards a decal to be removed. As explained hereinafter, means are provided not only for vertically moving power head 14 upwardly and downwardly, but for displacing it horizontally towards or away from the target decal.

A rigid, generally rectangular subframe 24 is captivated upon and vertically displaceable with respect to frame 14. As explained in detail hereinafter the subframe is displaced hydraulically to elevate or lower the power head 20 to a suitable attack elevation. A rigid, C-shaped bracket 27 projecting rearwardly from power head 20 terminates in rigid mounting plate 28 that is secured to a tilt mechanism 30 coupled to subframe 24. Plate 28, and thus power head 20, is normally, yieldably, spring-biased outwardly from subframe 24 by a plurality of springs 33 (FIG. 7) that are coaxially captivated by suitable fasteners 40 (FIG. 7) extending between plate mounting 28 and tilting plate 35 (FIGS. 2, 7) to be discussed hereinafter.

Frame 14 preferably comprises a rigid, lower base 50 that supports a pair of elongated, vertical stanchions 54 and 56. These spaced-apart and parallel stanchions extend perpendicularly from base 50 to rigid top 52. They may be secured within base 50 by suitable flanges 54B, 56B respectively. Similar flanges may terminate stanchions 54, 56 to the frame top 52. Preferably a rigid reinforcement 57 extends between stanchions 54, 65 beneath top 52. When the system 10 is mounted on a vehicle (FIG. 1) it is preferred that some form of reinforcement strut 60 (FIG. 1) be provided for stabilizing the apparatus 10. Strut 60 my extend from frame top 52 or reinforcement 57 to a suitable, rigid anchoring structure 62 associated with the vehicle 12.

The subframe 24 comprises a rigid, plate like central portion 70 of rectangular dimensions bounded at its sides by rigid sleeves 74, 76, that are slidably captivated to the frame 14. Sleeves 74, and 76 are respectively coaxially mounted to frame stanchions 54 and 56, enabling slidable, vertical displacements of the subframe 24. The subframe is displaced by hydraulic cylinder 80 secured to base 50. The hydraulic ram 82 (FIG. 4) terminates in a suitable coupling 84 at the rear of the subframe to force it upwardly or downwardly in response to cylinder elongation or contraction.

Figure 7:
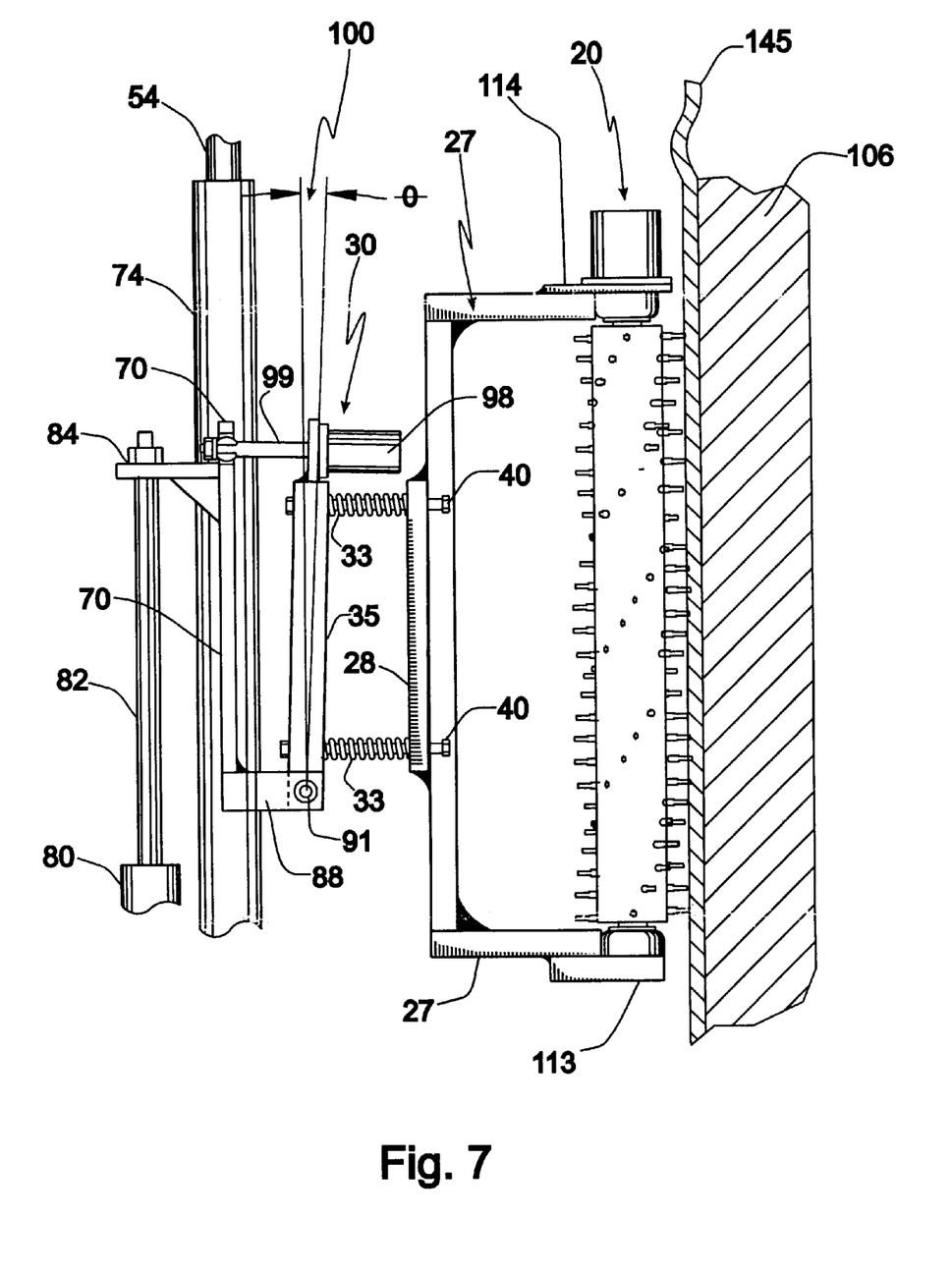

The power head 20 is dynamically linked to the vertically movable subframe 24 by the tilting mechanism 30. The rigid, generally vertically oriented tilting plate 35 is offset from the subframe midsection 70, and it may be pivoted with respect thereto. A pair of outwardly projecting arms 89, 88 (FIGS. 2, 4, 7) rigidly extend perpendicularly away from the bottom of the subframe central section 70. Plate 35 has an integral, lower clevis 90 pivotally locked between arms 88, 89 by a suitable fastener 91 (FIG. 7). The top of plate 35 mounts a small hydraulic cylinder 98 whose ram 99 (FIG. 7) extends towards and terminates in plate 70. The reference numeral 100 in FIG. 7 indicates angular deflection of plate 35 resulting from actuation of cylinder 98.

The power head 20 is coupled to the tilting plate 35 by four elongated fasteners 40 (FIGS. 2, 7) that extend approximately from the corners of tilting plate 35 to the corners of mounting plate 28. The heads of fasteners 40 are rigidly seated within and engage plate 35, but their opposite ends extend freely from plate 28. Plate 35 and 28 are normally yieldably biased apart by the four compression springs 33 that are coaxially captivated upon fasteners 40. However, it will be appreciated that when power head 20 is heavily "loaded" (i.e., urged against the truck body 106 being serviced) the spacing between plates 28, 35 may yieldably "adjust" in response to various pressures and the response of springs 33. Ideally, operation commences with the power head pressed against the decal to be removed, with the springs 33 compressed an inch or so.

Head 20 is thus "floated" to subframe 24 to provide a measure of "give" and to allow the apparatus to firmly maintain a desired pressure and an approximately correct dynamic. Springs 33 thus enable the power head to compensate for dimensional variations encountered upon the rough truck surface contour during actual operation. This compensation also diminishes the chances of parts breakage as the apparatus is driven past the truck trailer being serviced, whereupon the spacing between the drive vehicle and the trailer will inevitably vary slightly, and bumps or irregularities in the road surface will further deflect parts of the apparatus. Of course, preloading is amplified a bit by cylinder 98, that deflects plate 35 to angularly deflect the power head into proper angular engagement with the decal, further pressuring the power head 20.

Figure 3:
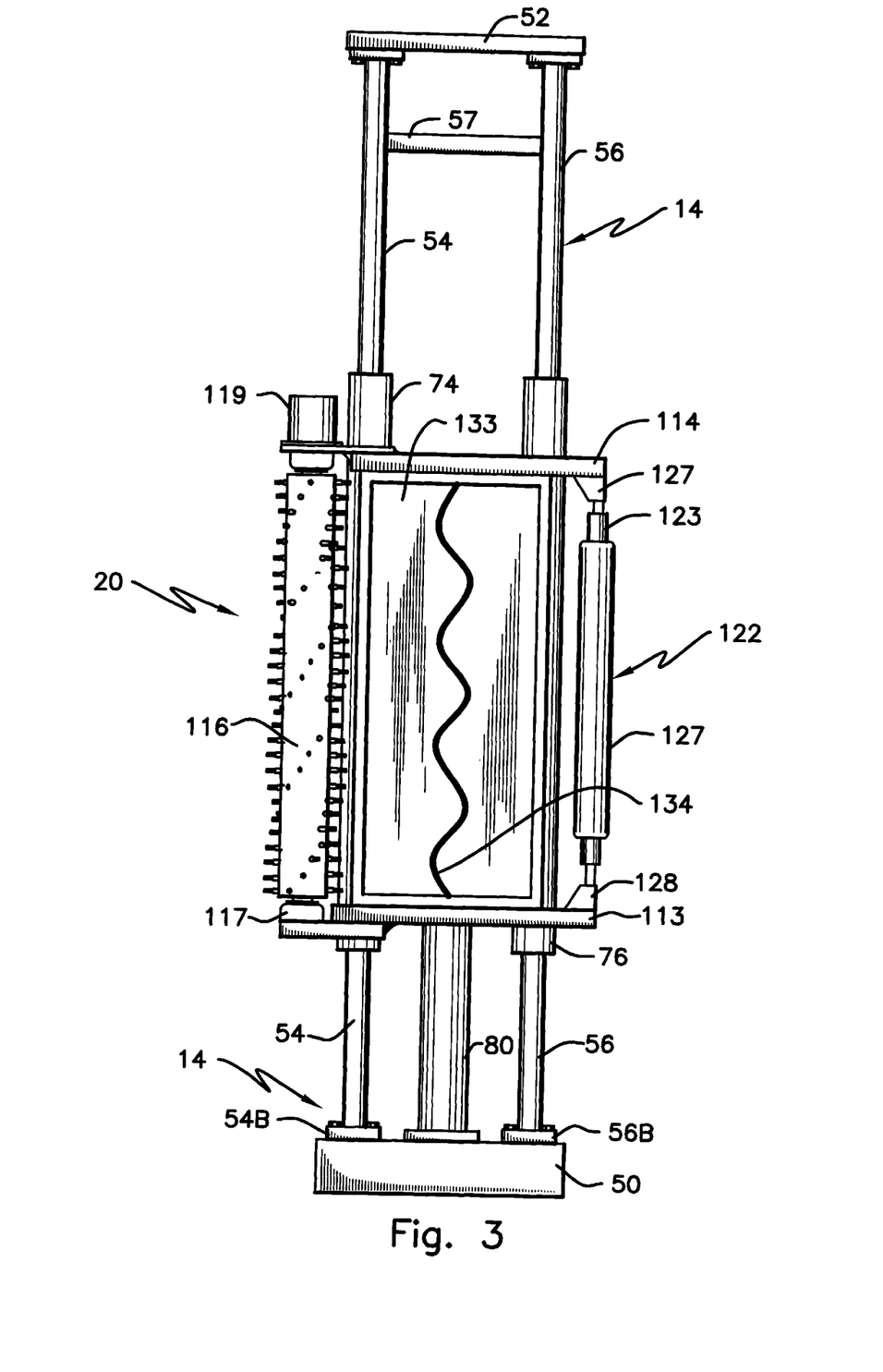
FIG. 3 is a front plan view thereof.
Figure 4:
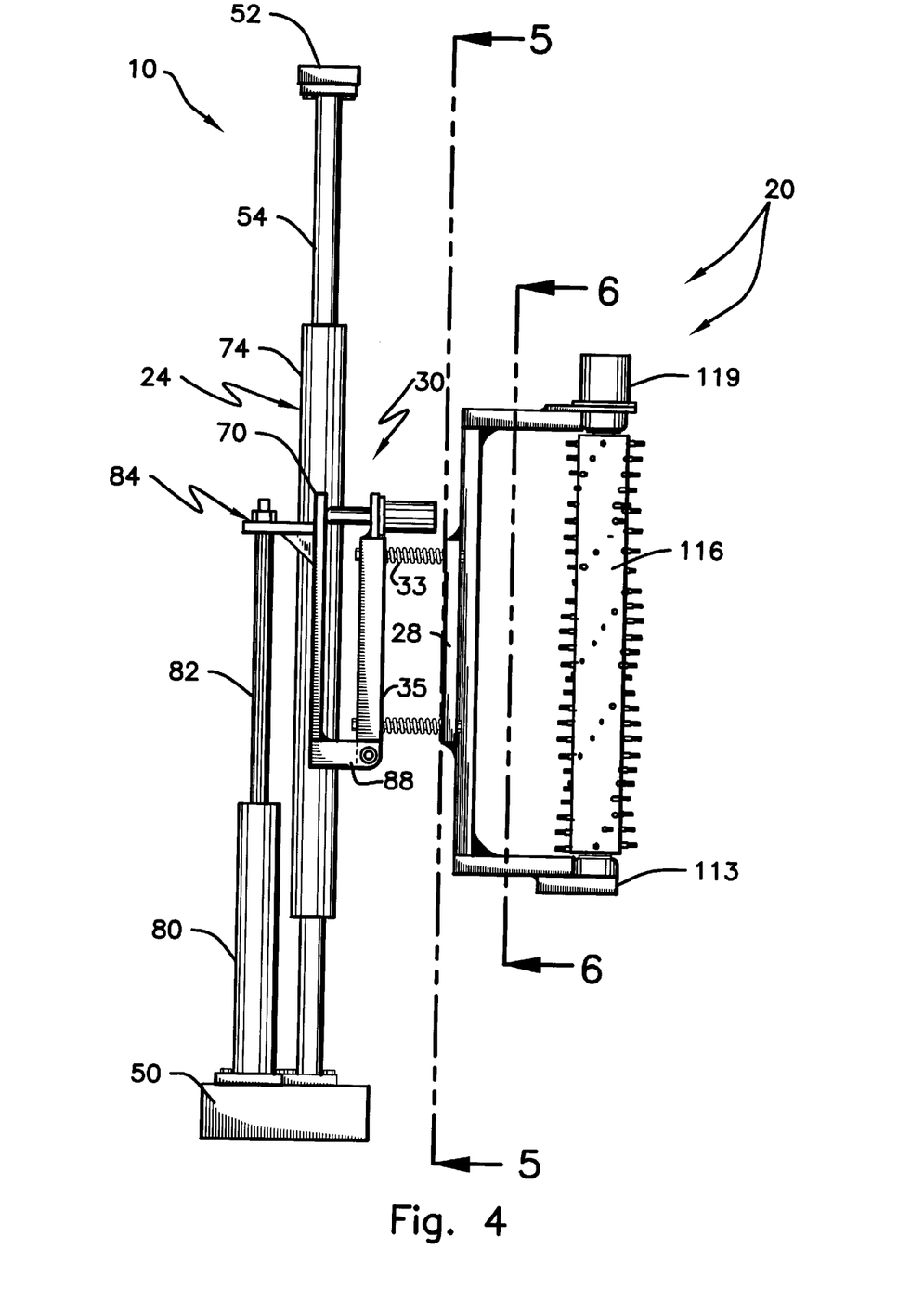
FIG. 4 is a side elevational view taken generally from a position to the left of FIG. 3.
Figure 5:
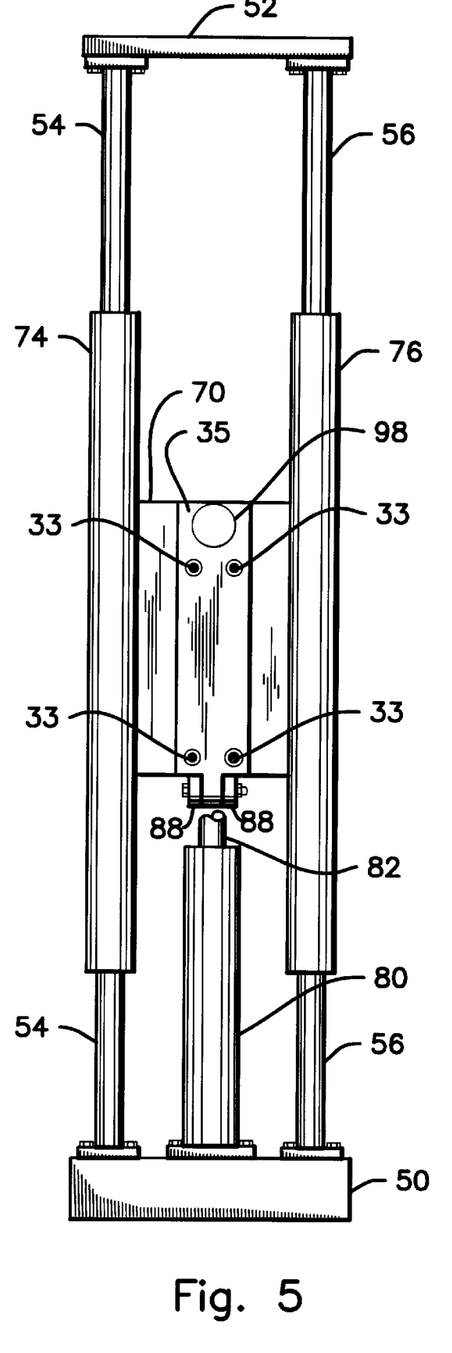
FIG. 5 is a partially fragmentary, elevational view taken generally along line 5—5 in FIG. 4.
Figure 6:
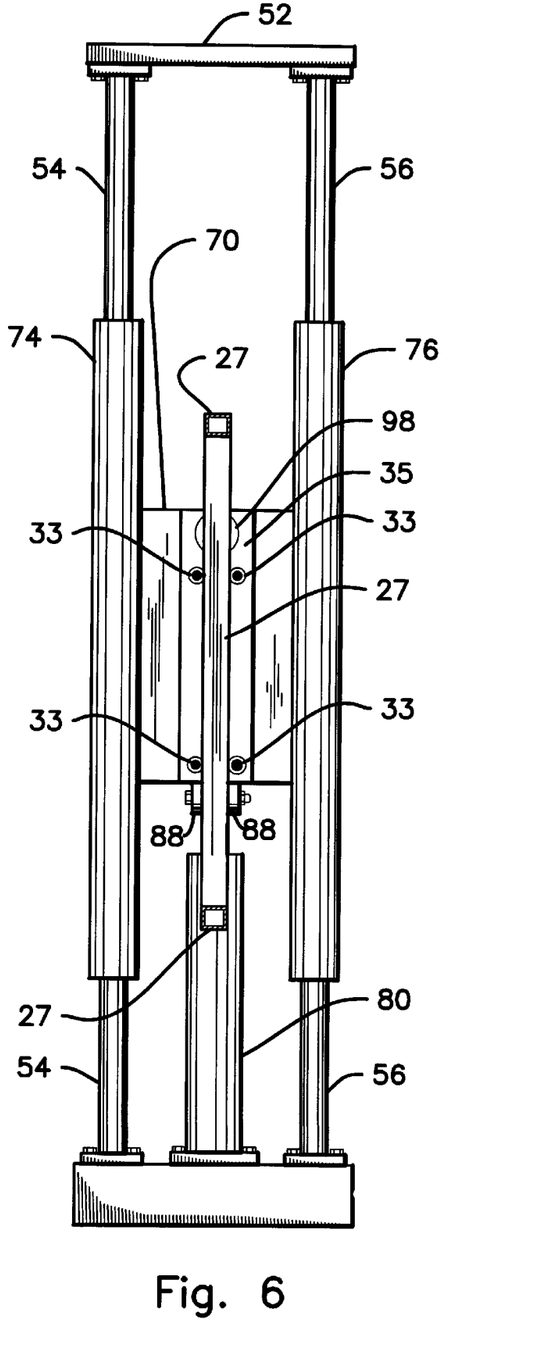
FIG. 6 is a partially fragmentary, elevational view taken generally along line 6—6 in FIG. 4; and, FIG. 7 is an enlarged, fragmentary side elevational view of the power head and tilting assembly.

The power head 20 is secured by the rearwardly extending, C-shaped bracket 27 that is rigidly secured to plate 28. The power head comprises a lower, horizontal strut 113 and a rigid, parallel, upper strut 114 (FIG. 3). At the left side of the power head 20 (i.e., as viewed in FIG. 3) an elongated, rotary brush 116 is mounted for rotation. It extends between bearing 117 in strut 113 and a hydraulic drive motor 119 at the top of strut 114. The rotating brush comprises approximately 260 outwardly projecting rubber fingers substantially arranged in the spiral pattern indicated. These are forcibly rubbed against the decal during the removal process. The brush removes the decal and adhesive at the same time.

At the right side of the power head (as viewed in FIG. 3) there is an elongated roller assembly 122 extending between tabs 127 and 128 emanating from the struts 114, 113 respectively. Bearings 123 provide smooth, dependable operation for the resilient roller that is pressed against the decal and rolls along it to support brush 116. A generally concave mirrored reflector 133 (FIGS. 2, 3) is disposed between the brush and the roller assembly 122. An electrically resistive heating element provides several thousand watts of radiant energy, that is directed uniformly upon the surface area of the decal immediately proximate the power head during treatment.

Operation

It is preferred that the apparatus 10 be mounted upon a suitable vehicle 12 such that it may be driven into position proximate a decal to be removed. Once the removal process starts, the vehicle moves the apparatus along the decal until it is completely separated from the truck trailer body. As the vehicle 12 rolls along, dimensional variances between the trailer and the vehicle are largely compensated for by the springs 33 (FIG. 7) dynamically mounting the power head 20 to the subframe 24.

Cylinder 98 must be initially activated to position the power head at the proper angle, wherein the brush 116 is pressed against the truck surface as flushly parallel as possible. Elevator cylinder 80 must be activated to select the desired initial elevation; as the process continues, the power head may be raised or lowered as required by activating cylinder 80. Hydraulic motor 119 will vigorously rotate brush 116 so that its finger will forcibly dislodge portions of the decal and the adhesive, in response both to pressure and the heat radiated by reflectors 133.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A decal removal system comprising:
    a rigid, upright frame adapted to be secured to a supporting surface;
    a dynamic power head slidably mounted to the frame, the power head comprising a brush for vigorously attacking a decal to be removed, a spaced apart roller for balancing the power head, and a source of radiant heat energy directed at the decal;
    means for vertically moving said power head upwardly or downwardly; and
    means for displacing the power head horizontally towards or away from the target decal.

2. The decal removal system of claim 1 wherein the frame comprises:
    a pair of spaced apart, rigid, vertical stanchions extending from a frame base to a frame top;
    a rigid, generally rectangular subframe vertically displaceable with respect to said frame, the subframe comprising a pair of sleeves that are coaxially penetrated by said stanchions for controlled movements with respect thereto.

3. The decal removal system of claim 1 wherein:
    the power head comprises a rigid, C-shaped bracket projecting rearwardly that terminates in a rigid mounting plate; and,
    the system comprises a tilting mechanism projecting from the subframe that flexibly connected to said rigid mounting plate by a plurality of compensation springs.

4. The decal removal system of claim 3 wherein said tilting mechanism comprises a tilting plate pivoted to said subframe, and hydraulic means for forcibly tilting said tilting plate.

5. The decal removal system of claim 4 wherein said tilting plate is coupled to said mounting plate by a plurality of fasteners that captivate compensation springs that normally bias the tilting plate and the mounting plate apart.

6. The decal removal system as in claim 4 wherein the power head is secured by a rearwardly extending, C-shaped bracket that is rigidly secured to the mounting plate.

7. The decal removal system of claim 4 wherein said brush comprises a plurality of separate, spaced apart outwardly projecting rubber fingers substantially arranged in a spiral pattern.

8. The decal removal system of claim 7 wherein the frame comprises:

a pair of spaced apart, rigid, vertical stanchions extending from a frame base to a frame top;

a rigid, generally rectangular subframe vertically displaceable with respect to said frame, the subframe comprising a pair of sleeves that are coaxially penetrated by said stanchions for controlled movements with respect thereto.

9. The decal removal system of claim 8 wherein:

the power head comprises a rigid, C-shaped bracket projecting rearwardly that terminates in a rigid mounting plate; and, the system comprises a tilting mechanism projecting from the subframe that flexibly connected to said rigid mounting plate by a plurality of compensation springs.

10. A power decal removal system comprising:

a rigid, upright frame adapted to be mounted upon a suitable motor vehicle, the frame comprising a pair of rigid, spaced apart stanchions, and a subframe slidably captivated to the stanchions;

hydraulic means for vertically moving said subframe upwardly or downwardly;

a dynamic power head comprising a brish for vigorously attacking a decal to be removed, a spaced apart roller for balancing the power head, and a source of radiant heat energy directed at the decal;

tilting means projecting from said subframe;

spring compensation means coupling said power head to said tilting means; and, means for displacing the power head horizontally towards or away from the target decal.

11. The decal removal system of claim 10 wherein the subframe comprises a pair of spaced apart sleeves that coaxially mount to said frame stanchions and enable vertical displacements with respect to said frame.

12. The decal removal system of claim 10 wherein:

the power head comprises a rigid, C-shaped bracket projecting rearwardly that terminates in a rigid mounting plate; and, the tilting mechanism comprises a tilting plate pivoted to the subframe, that flexibly connects to said rigid mounting plate by a plurality of compensation springs.

13. The decal removal system of claim 12 wherein said tilting mechanism comprises a tilting plate pivoted to said subframe, and said system comprises hydraulic means for forcibly tilting said tilting plate.

14. The decal removal system of claim 13 wherein said tilting plate is coupled to said mounting plate by a plurality of fasteners that captivate said spring compensation means.

15. The decal removal system of claim 14 wherein the subframe comprises a pair of spaced apart sleeves that coaxially mount to said frame stanchions and enable vertical displacements with respect to said frame.

16. A power decal removal system comprising:

a rigid, upright frame adapted to be mounted upon a suitable motor vehicle, the frame comprising a subframe vertically movable thereon;

power means for vertically moving said subframe upwardly or downwardly;

a dynamic power head comprising a brush for vigorously attacking a decal to be removed, a spaced apart roller for balancing the power head, and a source of radiant heat energy directed at the decal; and, spring compensation means for coupling said power bead to said subframe.

17. The decal removal system of claim 16 further comprising means for displacing the power head horizontally towards or away from the target decal.

18. The decal removal system of claim 16 wherein:

the power head comprises a rigid, C-shaped bracket projecting rearwardly that terminates in a rigid mounting plate; and, said subframe mounts a tilting plate that is flexibly connected to said rigid mounting plate by a plurality of compensation springs.

19. The decal removal system of claim 18 further comprising means for displacing the power head horizontally towards or away from the target decal.

* * * * *